Patented Oct. 6, 1931

1,826,166

UNITED STATES PATENT OFFICE

CLAUDE D. CORY, OF SEATTLE, WASHINGTON

CONCRETE ADMIXTURE COMPOSITION

No Drawing.  Application filed September 13, 1930. Serial No. 481,797.

My invention relates to concrete admixture compositions and certain objects of the invention are to provide a composition that permits reduction of mixing water when mixed with concrete and thereby increases the strength of concrete, renders it impervious and watertight, makes the concrete more homogeneous and prevents segregation and laitance, and renders the concrete of a more plastic consistency whereby its placement and workability are materially improved.

The primary factor underlying the advantages derived from my composition resides in the fact that, by its use, a larger reduction in the amount of water heretofore generally used may be made without diminishing the plasticity and workability of the concrete. The well established water-cement ratio law may be appropriately herein stated as follows: "For given materials and conditions of manipulation, the strength of concrete is determined solely by the ratio of the volume of mixing water to the volume of cement so long as the mixture is plastic and workable." Designing a concrete mix for a given strength, therefore, consists in selecting the water-cement ratio corresponding to the strength and finding the most suitable combination of aggregates which will give the desired workability when mixed with cement and water in this ratio.

It is a well known fact that it has heretofore been customary and necessary to use water greatly in excess of the amount which actually enters into combination with the cement in order to produce concrete of the desired plasticity and workability. This surplus of water serves to excessively dilute and reduce the strength of the cement paste, causes segregation of the aggregates and laitance particularly in the transportation of the concrete, produces voids and stone pockets, and results in a weakened and porous structure as a whole.

In the use of my composition an approximate twenty percent reduction in the amount of water heretofore generally used may be made, depending upon many factors and conditions, and an adequate workability and plasticity obtained. The lubricating properties of this composition causes the cement paste to completely surround each aggregate, eliminate voids, makes the concrete plastic, and permits the concrete to flow into all corners and angles of concrete forms and completely around all reinforcement and structural members.

Furthermore the plastic nature of the mix resulting from the use of my composition causes the aggregates to be held in suspension throughout the mass thus providing a homogeneous mixture wherein segregation of the aggregates and laitance is prevented, and a dense concrete is obtained. The proper use of this composition, whereby less water is used and the same plastic consistency is maintained, permits concrete to be hauled long distances in bath tub trucks and the like without segregation of the aggregates.

The concrete resulting from the use of this admixture is more homogeneous since it prevents the segregation of the various ingredients. Thus the concrete is made more watertight. Also since less water can be used, the cement paste binding the aggregates is thicker, making it more watertight.

When mixed with cement plaster, from three to ten percent of the admixture composition is used by weight of the cement and a water repellent plaster is obtained that is particularly useful for waterproof remedial or repair work.

My admixture composition consists of fused resinous manganese made by adding manganese dioxide and oil to melted rosin, a caustic soda solution made by disolving caustic soda in water or making a strong soap or liquor using some form of lye, silicate of soda, and coke oven or crude coal tar.

In preparing the composition I prefer to use the ingredients in substantially the following proportions:

| | Per cent |
|---|---|
| Fused resinous manganese salt | 00.34 |
| Caustic soda solution | 04.55 |
| Silicate of soda | 01.14 |
| Coke oven tar or crude coal tar | 93.97 |

In other words, to make fifty five gallons or five hundred pounds of the admixture composition I use the ingredients in about the following proportions:

| | Parts |
|---|---|
| Fused resinous manganese salt | 1½ |
| Caustic soda solution | 20 |
| Silicate of soda | 5 |
| Coke oven tar or crude coal tar | 4131½ |

Variation of a few gallons of the tar may be made without materially affecting the quality or action of the composition.

For making the resinous maganese salt, two hundred and fifty pounds of rosin is melted to six hundred degrees Fahrenheit and on receding temperature twelve and one-half pounds of manganese dioxide is added. When the temperature of the mass will permit, twenty-five to thirty gallons of L. C. oil or light oil taken from the street drip oil gas process is added.

For making the caustic soda solution, two pounds of caustic soda is mixed with five gallons of water, or a strong soap or liquor may be made using some form of lye. The caustic soda must be about sixty percent caustic.

The silicate of soda should be from thirty to sixty degrees Baumé. Coke oven or crude coal tar is preferably used. Each of the four ingredients hereinbefore mentioned are thoroughly mixed together and the admixture composition is ready for use in concrete.

In the use of the admixture, one pint of same is approximately equal to one pound. A long handled pint dipper may be conveniently used for measuring and the admixture should be poured over the sand and gravel in the skip or directly into the mixer after the water has been introduced and taken up by the concrete. The admixture should not come directly in contact with the dry cement. For ready mixed concrete from one to three pounds of the admixture is used for each cubic yard of concrete.

It will be understood that minor changes in the proportions of the ingredients may be resorted to without departing from the scope and spirit of the invention and the amount of the composition or admixture used in concrete may also be changed in accordance with various conditions. Having thus described my concrete admixture composition, what I claim and desire to secure by Letters Patent of the United States is:

1. A concrete admixture composition comprising fused resinous manganese salt, caustic soda solution, silicate of soda, and tar.

2. A concrete admixture composition substantially comprising 00.34% fused resinous manganese salt, 04.55% caustic soda solution, 01.14% silicate of soda, and 93.97% crude coal tar.

3. A concrete admixture composition substantially comprising 1½ pts. fused resinous manganese salt, 20 pts. caustic soda solution, 5 pts. silicate of soda, and 4131½ pts. crude coal tar.

4. A concrete admixture composition substantially comprising 00.34% fused resinous manganese salt, 04.55% caustic soda solution, 01.14% silicate of soda, and 93.97% coke oven tar.

5. A concrete admixture composition substantially comprising 1½ pts. fused resinous manganese salt, 20 pts. caustic soda solution, 5 pts. silicate of soda, and 4131½ pts. coke oven tar.

In testimony whereof I affix my signature.

CLAUDE D. CORY.